No. 707,936. Patented Aug. 26, 1902.
H. F. NORTHROP.
VARIABLE SPEED GEAR.
(Application filed June 3, 1902.)
(No Model.)
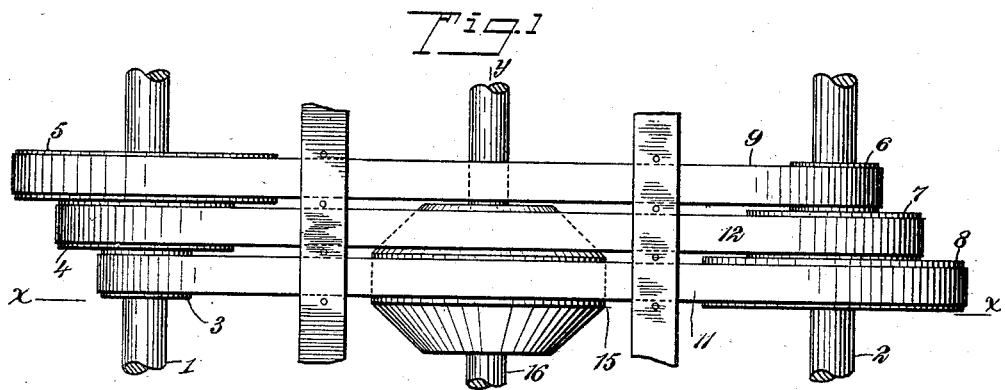
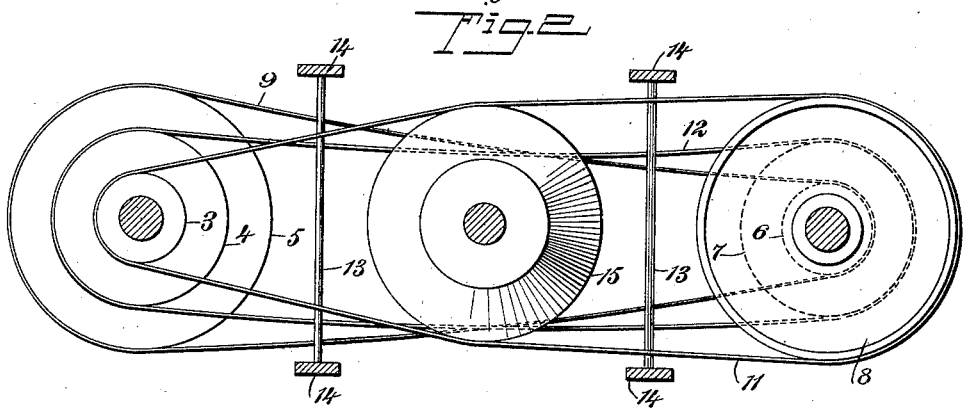
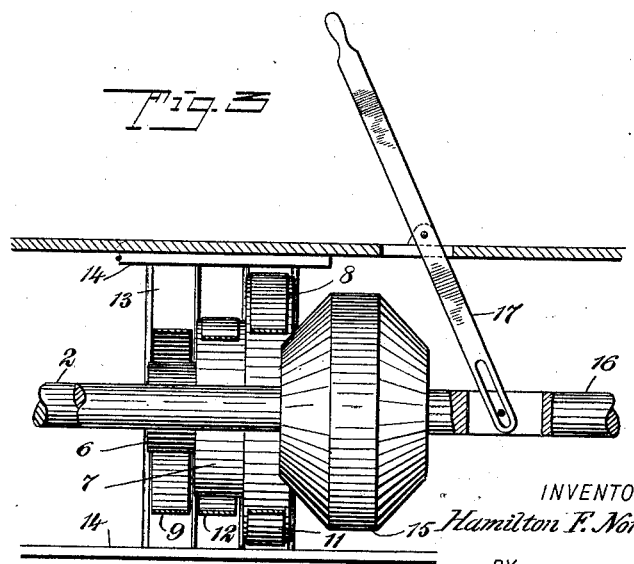
WITNESSES:
J. T. Brophy
C. R. Ferguson
INVENTOR
Hamilton F. Northrop
BY
ATTORNEYS.

UNITED STATES PATENT OFFICE.

HAMILTON FAY NORTHROP, OF NEW YORK, N. Y.

VARIABLE-SPEED GEAR.

SPECIFICATION forming part of Letters Patent No. 707,936, dated August 26, 1902.

Application filed June 3, 1902. Serial No. 110,077. (No model.)

*To all whom it may concern:*

Be it known that I, HAMILTON FAY NORTHROP, a citizen of the United States, and a resident of the city of New York, borough of Manhattan, in the county and State of New York, have invented a new and Improved Variable-Speed Gear, of which the following is a full, clear, and exact description.

This invention relates to improvements in variable-speed gear particularly adapted for use in connection with automobiles, although it may be used in other connections.

The object is to provide a gearing of this character of very simple construction and that may be produced at a small cost as compared with speed-gear embodying toothed wheels or friction-clutches, the device also operating without the shock in starting and stopping incident to meshing gears.

I will describe a variable-speed gear embodying my invention and then point out the novel features in the appended claims.

Reference is to be had to the accompanying drawings, forming a part of this specification, in which similar characters of reference indicate corresponding parts in all the figures.

Figure 1 is a plan view of a variable-speed gear embodying my invention. Fig. 2 is a side elevation and a section on the line $x\,x$ of Fig. 1, and Fig. 3 is a section on the line $y\,y$ of Fig. 1.

Referring to the drawings, 1 designates what may be termed the "driving-shaft," and 2 the "driven shaft." Mounted on the shaft 1 are the step-pulleys 3, 4, and 5, while similar step-pulleys 6, 7, and 8 are arranged on the shaft 2, but in opposite order—that is, the large pulley 5 of the shaft 1 is opposite the small pulley 6 of the shaft 2—and connection is made between the two pulleys by a band 9. The small pulley 3 of the shaft 1 is opposite the large pulley 8 on the shaft 2, and these two pulleys are connected by a band 11, while the opposite intermediate pulleys 4 and 7 are connected by a band 12. These bands are prevented from slipping off the sides of the pulleys by means of rods 13, which pass down between adjacent bands and also down at the outer sides of the outer bands 9 and 11, these several bars being connected to cross-pieces 14.

In the operation of this device it is to be understood that when two opposite pulleys are in driving connection by means of their band the bands of the other pulleys will remain loose or inactive. I provide a means, however, whereby any one of the bands may be placed in operative condition. This means, as here shown, consists of a take-up pulley 15, mounted on a shaft 16, designed to slide transversely in suitable bearings, and this shaft carrying the pulley 15 may be moved by means of a lever 17. The opposite sides of the pulley 15 are tapered outward and toward the shaft 16, so as to form cam-surfaces to be engaged by the belts, whereby the larger or operative portion of the pulley 15 may be passed between the upper and lower stretches of a band.

In Figs. 1 and 2 the pulley 15 is shown as in engagement with the band 11, connecting the pulleys 3 and 8, while the other bands 9 and 12 remain slack. Therefore a slower motion will be imparted to the driven shaft 2 than that of the driving-shaft 1. If it is desired to make an equal speed between the two shafts, the take-up pulley is to be moved between the stretches of the band 12, thus bringing it taut and in operative connection with the pulleys 4 and 7, and obviously by moving the take-up pulley in connection with the band 9 the shaft 2 will be driven at a greater speed than the driving-shaft.

Having thus described my invention, I claim as new and desire to secure by Letters Patent—

1. A variable-speed gear comprising a driving-shaft, a driven shaft, step-pulleys on the shafts arranged in reverse order, belts connecting opposite pulleys, a take-up pulley mounted to slide transversely of the first-named pulleys, the said take-up pulley having cam-shaped or tapered sides, and means for shifting said take-up pulley, substantially as specified.

2. A variable-speed gear comprising a driving-shaft, a driven shaft, step-pulleys arranged on said shafts in reverse order, band connections between opposite pulleys, means for preventing lateral movement of the bands on the pulleys, a shaft mounted to slide transversely of the pulleys, a take-up pulley mounted on said sliding shaft and having inclined sides, a lever for shifting said shaft, and fixed rods extending downward between adjacent belts, substantially as specified.

In testimony whereof I have signed my name to this specification in the presence of two subscribing witnesses.

HAMILTON FAY NORTHROP.

Witnesses:
ALBERT E. HOLT,
JAMES O. ROPER.